United States Patent
Mason et al.

(10) Patent No.: US 6,331,784 B1
(45) Date of Patent: Dec. 18, 2001

(54) SECURE PROGRAMMABLE LOGIC DEVICE

(75) Inventors: Martin T. Mason, San Jose; Nancy D. Kunnari, Sunnyvale; Harry H. Kuo, San Jose, all of CA (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 09/627,351

(22) Filed: Jul. 28, 2000

(51) Int. Cl.$^7$ .................. H03K 19/00; H04L 9/00
(52) U.S. Cl. .................. 326/8; 326/37; 713/200; 711/163
(58) Field of Search ................ 326/41, 8, 40, 326/46, 47, 37; 713/200; 711/163

(56) References Cited

U.S. PATENT DOCUMENTS

| | | | |
|---|---|---|---|
| 4,812,675 | 3/1989 | Goetting | 307/443 |
| 4,852,044 | 7/1989 | Turner et al. | 364/900 |
| 4,972,105 | 11/1990 | Burton et al. | 307/468 |
| 5,349,249 | 9/1994 | Chiang et al. | 307/465 |
| 5,388,157 | 2/1995 | Austin | 380/4 |
| 5,446,864 | 8/1995 | Burghardt et al. | 395/427 |
| 5,450,022 | 9/1995 | New | 326/39 |
| 5,640,107 | 6/1997 | Kruse | 326/38 |
| 5,640,347 | 6/1997 | Lin et al. | 365/185.04 |
| 5,768,372 | 6/1998 | Sung et al. | 380/3 |
| 5,915,017 | 6/1999 | Sung et al. | 380/3 |
| 5,954,817 | * 9/1999 | Janssen et al. | 713/200 |
| 5,970,142 | 10/1999 | Erickson | 380/21 |
| 6,088,262 | 7/2000 | Nasu | 365/185.04 |
| 6,100,714 | * 8/2000 | Xiao et al. | 326/39 |

* cited by examiner

*Primary Examiner*—Michael Tokar
*Assistant Examiner*—Daniel D. Chang
(74) *Attorney, Agent, or Firm*—Thomas Schneck; Mark Protsik

(57) ABSTRACT

A programmable logic chip and configuration memory chip are mounted within a multi-chip module to form a single package. The configuration memory has a security bit which in a first state allows programming and read-back of configuration data in the memory chip via external pins of the package, and in a second state allows only erase command to be communicated to the memory chip via the external pins. The internal data transfer connection between the memory chip and programmable logic chip is enabled when the security bit is in the second state and the memory chip is in a read-back mode, allowing configuration data to be loaded into the logic chip upon power up.

4 Claims, 2 Drawing Sheets

SECURE PROGRAMMABLE LOGIC DEVICE

TECHNICAL FIELD

The present invention relates to SRAM-based programmable logic integrated circuits, such as field programmable gate arrays (FPGAs), in which the configuration code defining the logic circuit's programmed functionality is loaded from a configuration memory or microcontroller into the logic circuit at power up. The invention relates in particular to schemes for protecting the contents of the configuration memory from copying.

BACKGROUND ART

As programmable logic integrated circuits become denser, cheaper and faster, they are increasingly being used in high production volume designs that historically have instead employed gate array or standard cell ASIC. This transition to programmable logic circuitry creates opportunities for design theft which do not occur with ASICs to the same extent. Design theft is of special concern with SRAM-based chips that power up "unconfigured" and must be loaded from a separate configuration memory. The problem with these devices from a security standpoint is that SRAM-based programmable logic circuitry, such as many FPGAs, lose their programmed configuration on power down. Each time a SRAM-based FPGA is powered up, a bit stream is loaded into the device from an external memory source, which is usually a non-volatile memory chip, such as an EPROM or EEPROM, or sometimes a microcontroller. FIG. 1 illustrates a typical unsecured system of the prior art. Programmable logic 11 and configuration memory 13 (or microcontroller) chip packages are both mounted on a printed circuit board 15 with a data connection 17 between them so that configuration data can be loaded into the programmable logic 11 on power up. The external memory device 13 is a unsecured device that is easily removed from the board. Using a commercial programmer, the contents of the memory device 13 can be read and copied. Alternatively, the data line 17 and the memory's external pins 19 form a unsecured link in which the configuration bitstream can be read as the data is transferred into the programmable device 11 by placing a probe on the printed circuit board trace 17 or the device pins 19 and using a logic analyzer to capture the data. Once captured the data can be readily duplicated, allowing theft of whole circuit designs.

Antifuse, EEPROM and flash memory-based devices also aren't immune from reverse-engineering or duplication. If the design is valuable enough, a clever cracker will strive mightily to figure out a way to extract it. High voltage application on external pins to put the part into a test mode, and die probing, are some of the techniques used here.

Because unscrupulous systems manufacturers exist who ignore all valid copyright and patent claims to a circuit design, or are insulated by weak intellectual property laws in some countries, and will not hesitate to copy new circuit designs in the rush to make a quick profit, it is increasingly desirable to find ways to secure the contents of the configuration memory.

Presently, security schemes involve a combination of a security bit in the memory devices and encryption of the serial data stream being transferred to the programmable logic. Such techniques are described in U.S. Pat. Nos. 4,812,675; 4,852,044; 5,349,249; 5,388,157; 5,446,864; 5,640,347; 5,768,372; 5,915,017; and 5,970,142. However, while a security bit is easily implemented, encryption of the data stream adds complexity and cost to both the memory chip and the target programmable device.

An object of the invention is to provide a simpler and less costly way to secure configuration data from dishonest manufacturers.

DISCLOSURE OF THE INVENTION

The object is met by combining the use of a security bit for the configuration memory with the incorporation of both memory and programmable logic chips in a single package. Use of a multi-chip module internalizes the data transfer from the memory to the logic chip so that it cannot be probed without disassembling the package. The security bit prevents read out of the configuration memory contents through the module's external pins.

BEST MODE OF CARRYING OUT THE INVENTION

Figure 1:
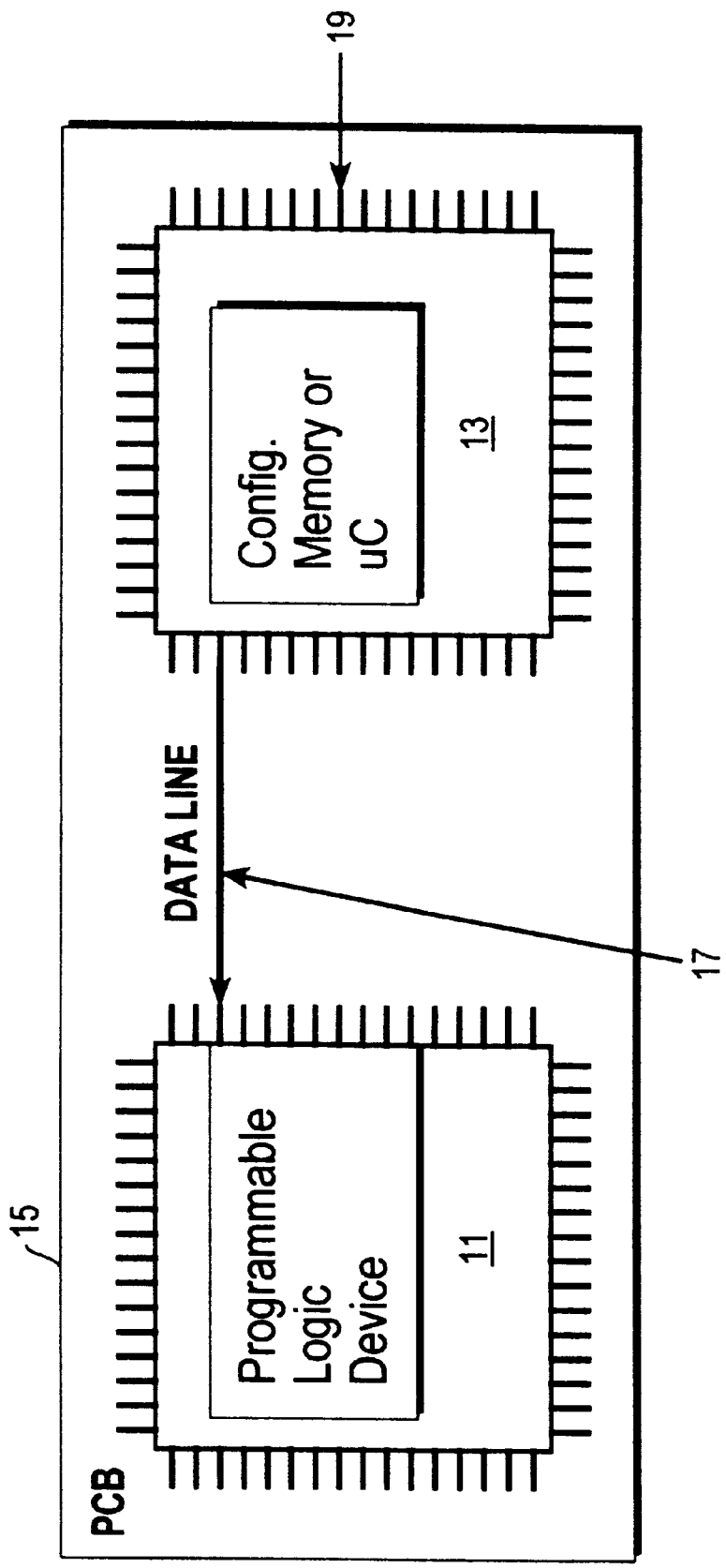
FIG. 1 is a schematic plan view of a prior art unsecured logic system in which programmable logic and configuration memory devices are mounted on a printed circuit board.
Figure 2:
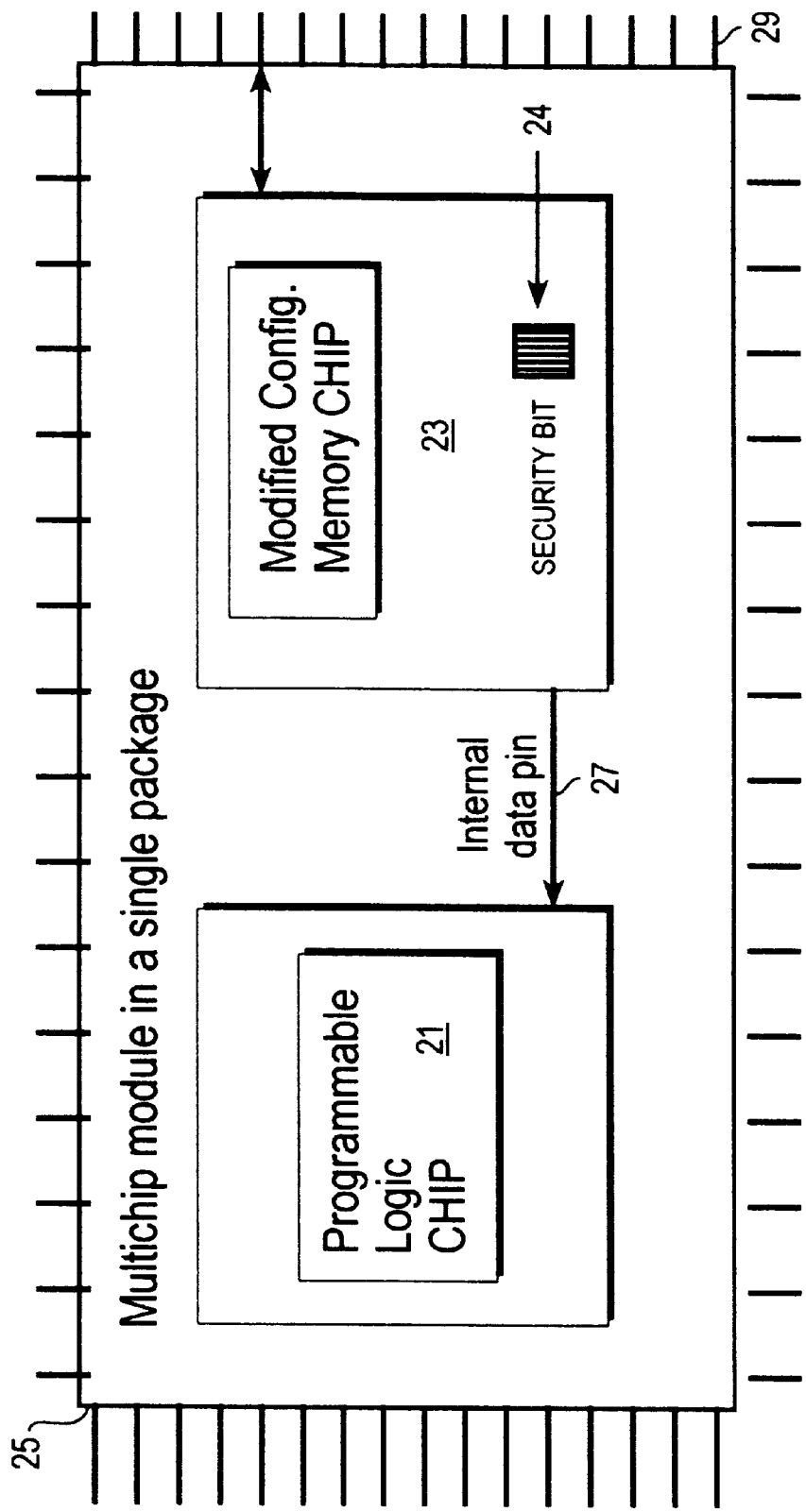
FIG. 2 is a schematic plan view of secure logic system of the present invention.

In FIG. 2, a multi-chip module 25 with external pins 29 has an SRAM-based programmable logic chip 21 and a configuration memory chip 23 mounted within, all forming a single package. The programmable logic chip 21 could be a field programmable gate array (FPGA), in-system configurable programmable logic device (PLD) or other logic that requires a configuration to be loaded upon power up. The external pins 29 connect to the chips 21 and 23 and an internal data connection 27 connects the configuration memory chip 23 to the logic chip 21 in a manner that permits configuration to be loaded into the logic chip 21 on power up. The multi-chip module could form a system-level integrated circuit device combining logic, memory and microcontroller in a single package.

The configuration memory 23 has two modifications. The first is the addition of a security bit 24. When the security bit 21 is set it is not possible to read the contents of the device 23 back through the normal programming pins 29. The only operation that can be performed on the device 23 is a chip erase which will remove the contents of the device 23. Once the device 23 is erased it can be reprogrammed with new code by the manufacturer/customer, however it is not possible to extract existing code out of the device 23.

The second modification is the addition of an internal connection 27. This line 27 allows data to be loaded into the programmable logic device 21 completely internal to the package 25. This prevents the use of a logic analyzer or similar test equipment to capture the data as it is loaded into the device 21. By internalizing the data connection 27 (which is only enabled when the security bit 24 is set and the configuration memory 23 is in a read-back mode) it is possible to load the programmable logic device 21 from configuration memory 23 without ever disclosing the memory contents external to the package 25.

External data pins 29 allow for device programming and for setting of the EEPROM based security bit 24. When the security bit 24 is set (active) this programming connection will only respond to a device erase command. No data can be read out of these external programming/data pins 29 when the security bit 24 is set.

Internal connection 27 allows serial data transfer to logic device 21 without the data being observed and captured externally.

What is claimed is:

1. A secure programmable logic integrated circuit system, comprising:

a multi-chip module having external pins;

a programmable logic chip mounted in said multi-chip module and in communication with said external pins; and a configuration memory chip mounted in said multi-chip module, the configuration memory chip storing configuration data for programming a configuration of said programmable logic chip via a data transfer connection internal to said multi-chip module, the configuration memory in communication with said external pins for program and erase commands and configuration data to be stored in said configuration memory chip, wherein said configuration memory chip includes a security bit, said security bit having a first state in which configuration data may be programmed and read-back through said external pins of said multi-chip module, said security bit having a second state in which only an erase command can be communicated via said external pins and in which said internal data transfer connection is enabled.

2. The system of claim 1 wherein said programmable logic chip comprises a field programmable gate array (FPGA).

3. The system of claim 2 wherein said programmable logic chip includes non-programmable logic block, integrated therein.

4. The system of claim 2 wherein said programmable logic chip also incorporates a microcontroller.

* * * * *